(12) United States Patent
Ford et al.

(10) Patent No.: US 8,787,176 B2
(45) Date of Patent: Jul. 22, 2014

(54) SWITCH THAT MONITORS FOR FINGERPRINTED PACKETS

(75) Inventors: Daniel E. Ford, Granite Bay, CA (US); Gregory D. Dolkas, Auburn, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 241 days.

(21) Appl. No.: 13/259,551

(22) PCT Filed: Oct. 29, 2009

(86) PCT No.: PCT/US2009/062642
§ 371 (c)(1), (2), (4) Date: Sep. 23, 2011

(87) PCT Pub. No.: WO2011/053299
PCT Pub. Date: May 5, 2011

(65) Prior Publication Data
US 2012/0033558 A1    Feb. 9, 2012

(51) Int. Cl.
*H04L 12/26* (2006.01)
*H04L 12/28* (2006.01)
*G06F 15/173* (2006.01)

(52) U.S. Cl.
USPC ........... 370/241; 370/252; 370/255; 370/392; 370/395.32; 370/401; 709/223; 709/224

(58) Field of Classification Search
USPC ......... 370/229–234, 241, 252, 254–255, 390, 370/392, 395.31; 709/723–724, 223–224
See application file for complete search history.

(56) References Cited

U.S. PATENT DOCUMENTS

| | | | |
|---|---|---|---|
| 7,051,066 B1 | 5/2006 | Albert et al. | |
| 7,316,031 B2 * | 1/2008 | Griffith et al. | 726/22 |
| 7,424,744 B1 * | 9/2008 | Wu et al. | 726/23 |
| 7,500,004 B1 * | 3/2009 | Homer | 709/228 |
| 7,656,812 B2 * | 2/2010 | Tadimeti et al. | 370/248 |
| 8,102,783 B1 * | 1/2012 | Narayanaswamy et al. | 370/252 |
| 8,364,808 B2 * | 1/2013 | Shima | 709/224 |
| 2001/0055274 A1 * | 12/2001 | Hegge et al. | 370/229 |
| 2005/0240780 A1 * | 10/2005 | MacIsaac | 713/188 |
| 2006/0023709 A1 * | 2/2006 | Hall et al. | 370/389 |
| 2006/0117099 A1 * | 6/2006 | Mogul | 709/223 |
| 2008/0025322 A1 | 1/2008 | Tadimeti et al. | |
| 2008/0159167 A1 * | 7/2008 | Ito et al. | 370/252 |

FOREIGN PATENT DOCUMENTS

| | | |
|---|---|---|
| KR | 10-0317126 | 12/2001 |
| KR | 10-2006-0075301 | 7/2006 |
| KR | 10-2009-0062743 | 6/2009 |

OTHER PUBLICATIONS

IPRP, PCT/US2009/062642, May 10, 2012.
ISR-WO, PCT/US2009/062642, Jul. 28, 2010.

\* cited by examiner

*Primary Examiner* — Candal Elpenord

(57) ABSTRACT

A switch comprises a switching module coupled to a plurality of ports. The switching module receives and forwards a plurality of packets through the ports. The switch also comprises a management unit comprising a processor and an agent executable by the processor. The agent causes the processor to monitor each packet received by the switching module and determine whether each such packet contains a predetermined fingerprint. Upon determining that a packet contains the predetermined fingerprint, the processor causes additional information to be included in a copy of the fingerprinted packet and forwarded to a predetermined address. The switching module also forwards the packet containing the predetermined fingerprint, but without the additional information, to an address corresponding to a destination address contained in the packet. A method of programming the switches is also described as well as a management workstation used to program the switches and analyze the fingerprinted packets.

13 Claims, 4 Drawing Sheets

SWITCH THAT MONITORS FOR FINGERPRINTED PACKETS

BACKGROUND

Some computer networks employ a data collection protocol (e.g., sFlow) that periodically samples packets in the network. Each such sampled packet is forwarded to an analyzing unit that analyzes the sampled packets. The analysis of the sampled packets provides information about the performance of the network such as traffic congestion, latency, etc.

While such sampling protocols provide useful information without substantially impairing the performance of the network, not all packets of course are sampled. Consequently, a user such as a network administrator may be interested in the performance of a certain area of the network (e.g., a certain switch or set of switches) but does not have enough information about that area because not enough packets passing through that particular area are being sampled.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. The term "system" refers to a collection of two or more constituent parts. The term system could refer to a network (e.g., a collection of computers, switches, etc.) or a subsystem within an electronic device (e.g., a subsystem within a switch, computer, etc.).

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
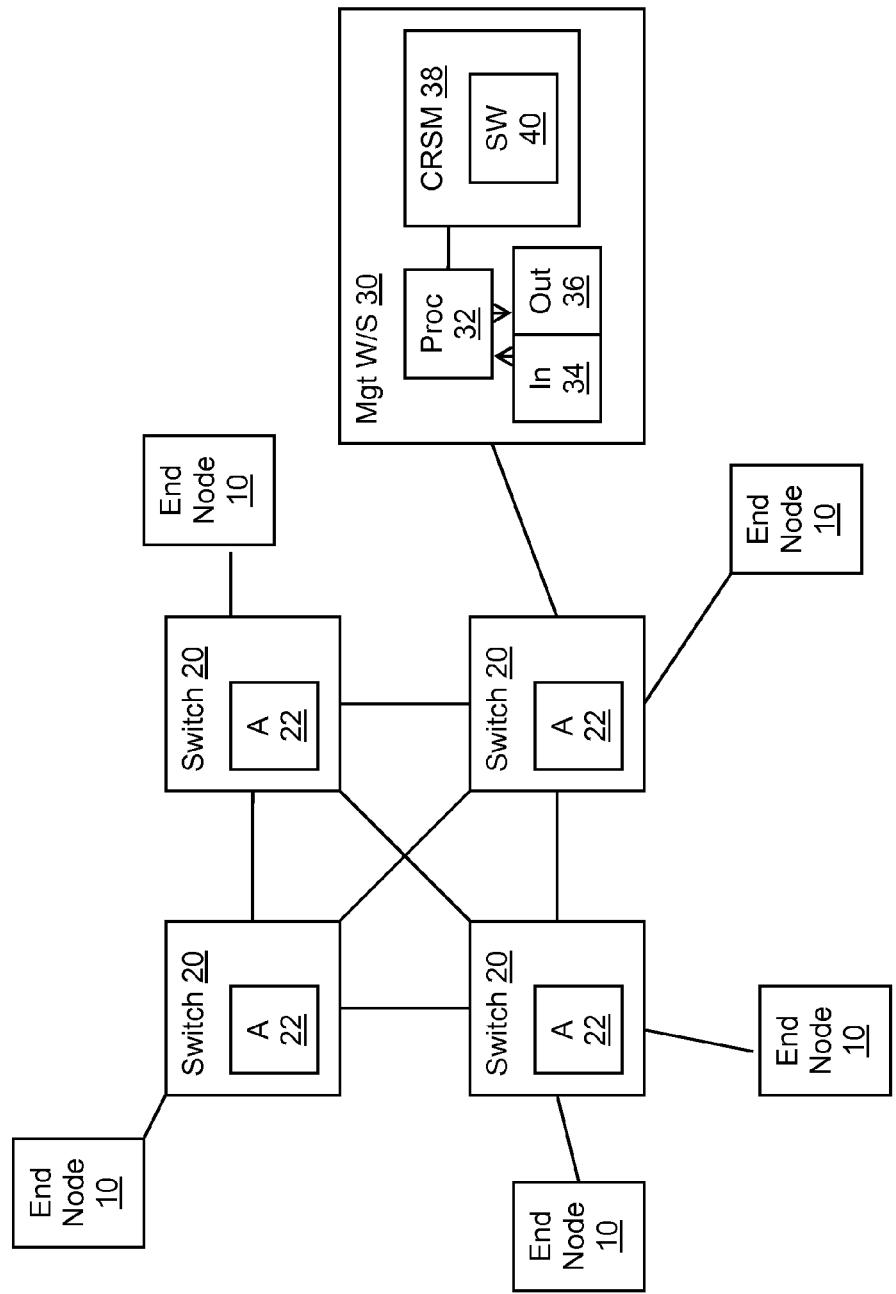
FIG. 1 shows a network in accordance with various embodiments of the invention.

FIG. 1 shows a network in accordance with various embodiments. The network comprises various end nodes 10 coupled together via various network devices 20 such as switches. The interconnection between the switches 20 may be configured as desired. The end nodes 10 may comprise any type of computing devices such as computers, storage devices, printers, etc. The switches 20 receive packets from the end nodes 10 or other switches and forward such packets on to other switches or end nodes. In some embodiments, each switch 20 comprises a forwarding table which is usable to determine how the switch is to forward any given packet it receives. The network also includes a management workstation 30 coupled to one of the switches 20.

Figure 2:
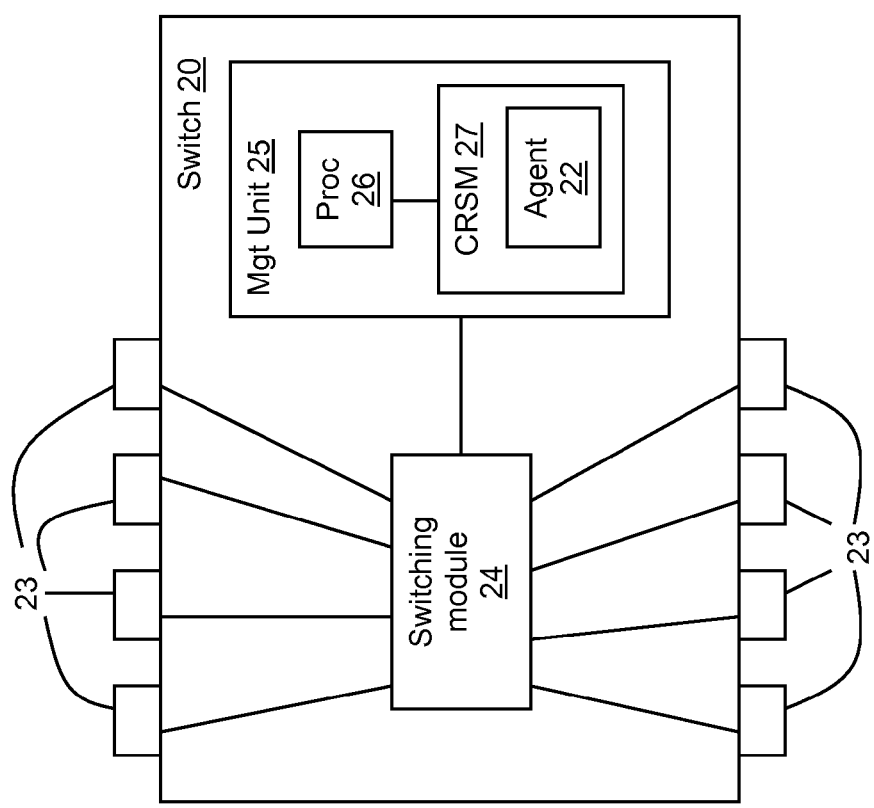
FIG. 2 shows a switch used in the network of FIG. 1 in accordance with various embodiments.

FIG. 2 shows a system diagram applicable to each switch 20 in accordance with various embodiments. As shown, the switch 20 comprises a number of switch ports 23 coupled to a switching module 24 which functions to receive each such incoming packet from a port 23, determine through which port 23 each incoming packet is to be routed (e.g., by consultation of a routing table), and forward the packet out the appropriate port 23. The switching module 24 couples to a management unit 25 which comprises a processor 26 and a computer readable storage medium (CRSM) 27. The CRSM 27 may comprise volatile memory and/or non-volatile storage. The CRSM 27 comprises an agent 22 which may be software that is executed by processor 26. Any reference herein to a function performed by the agent 22 is to be understood as being performed by the processor 26 executing the agent software 27.

Referring again to FIG. 1, each switch 20 contains an agent 22. In accordance with various embodiments, each agent 22 is configured to sample a subset of the packets received by the switch 20 and forward a modified copy of each sampled packet to the management workstation 30 for purposes of network analysis. For example, an agent 22 may be configured to sample one packet out of every 500 packets received. Further still, an agent may be configured to vary slightly how the packets are sampled so as to maintain a predetermined average sampling rate. For example, the average sampling rate desired may be one packet out of every 500 packets, but exactly every $500^{th}$ packet may not be sampled. Instead, a given packet may be sampled followed by the $505^{th}$ subsequent packet followed by the $495^{th}$ subsequent packet, the result being that the average sampling rate is once per 500 packets. The sFlow network sampling protocol may be used.

Once a packet is selected for sampling, the agent 22 generates a copy of the sampled packet and includes (e.g., appends) additional information to the copy to form a "datagram." The additional information may comprise information usable to assess the behavior of the network. The additional information appended to the copy of the sampled packet may comprise such information as a user ID, a next hop source/destination mask, an interface counter value, etc. After making a copy of a packet and appending the additional information, the agent 22 forwards the sampled packet with the appended additional information to the management workstation 30, which is resident at a predetermined address (e.g., internet protocol (IP) address) known to the agents 22. Accordingly, all of the agents 22 sample packets passing through their respective switches 20 and forward copies of the sampled packets having the additionally appended information to the management workstation 30. The sampled packets are also forwarded by the switch 20 in accordance with the destination address in the packet itself.

The management workstation 30 receives the copies of the sampled packets and performs one or more of various functions such as: stores the sampled packets, analyzes the sampled packets, and displays statistics pertaining to the sampled packets (e.g., number of sampled packets per unit of time).

In accordance with some embodiments the agents 22 and the management workstation 30 implement the sFlow protocol to sample the network traffic. In other embodiments, sampling protocols other than sFlow may be implemented.

In accordance with various embodiments, in addition to the periodic sampling of the network traffic, packets may be injected into the network that have a predetermined "fingerprint." Such packets may be configured merely to be routed through the network from end node, through one or more switches 20, to another end node for no purpose other than for the sampling function of the agents 22 described above to process the packets (forward a modified copy of such fingerprinted packets to the management workstation 30). As such, the management workstation 30 can determine the specific route that the fingerprinted packets took and use such information to further assess the performance of the network. Thus, the agents' sampling function processes sampled packets as well as fingerprinted packets.

In accordance with various embodiments, the fingerprint is a predetermined bit sequence that, when included in the packet, does not alter the behavior of the packet or the way in which the network would otherwise route the packet from its source location to the destination location. In some embodiments, the fingerprint may be in accordance with the fingerprint disclosed in U.S. patent application Ser. No. 12/480,428 titled "Method and System for Communicating with a Network Device," incorporated herein by reference, which discloses a technique for modifying the cyclic redundancy check bits using a reversible function to provide a marked data packet (termed "fingerprint" in the present disclosure). In other embodiments, the fingerprint could include a predetermined Access Control List (ACL) dedicated for only this purpose.

The management workstation 30 comprises a processor 32 coupled an input device 34 (e.g., keyboard, mouse, etc.), an output device 36 (e.g., a display), and a computer readable storage medium (CRSM) 38. The CRSM 38 may comprise volatile memory (e.g., random access memory), non-volatile storage (e.g., hard disk drive, Flash storage, compact disc read-only memory (CD ROM), etc.), or combinations thereof. The CRSM 38 comprises software 40 that is executable by processor 32. In accordance with at least some embodiments, any function attributable the management workstation 30 may be performed by the processor 32 executing software 40. Such functionality may also be described herein as attributed either to the processor 32 or the software 40 as short-hand, but such management workstation functionality generally is implemented by the processor 32 executing the software 40.

The software 40 causes the processor 32 to provide a graphical user interface (GUI) accessible by a user of the management workstation 30. The GUI is displayed on output device 36. By way of the GUI, a user can enable a function whereby some or all switches in the network monitor packets for the fingerprint. The GUI also enables a user to specify the specific fingerprint that the agents 22 are to monitor for, as well as enable the user to cause packets encoded with the fingerprint into the network.

Using the input device 34 and output device 36, the user may enable a function whereby the agents 22 monitor packets for the fingerprint. The processor 32 responds to this function being enabled by sending a management packet to all of the agents 22 in the network. The management packet contains directs the agents to begin monitoring for the fingerprint and also specifies what the specific fingerprint is to be monitored. In other embodiments, the agents 22 may be pre-programmed with the fingerprint and the management packet thus may not specify the fingerprint. As the agent 22 examines the packets passing through its switch, the agent examines each packet to determine which packets, if any, match the fingerprint.

The agent 22 then causes the switch 20 to route the fingerprinted packet on through the network in accordance with how the switch 20 would have routed the packet even without the monitoring and fingerprinting. In addition, the agent 22 makes a copy of the packet, with or without the fingerprint, appends additional information (such as the information noted above), and forwards a copy of the packet with the additional information to the management workstation 30 for analysis.

As the fingerprinted packet winds its way through the network from switch to switch, each switch's agent 22 monitors all incoming packets for the fingerprint. When an agent 22 detects a packet with the specified fingerprint, that agent routes the packet on in accordance with its normal routing behavior and also makes a copy of the packet, appends additional information to the copy of the packet (same or similar sort of information as noted above), and forwards the copy of the packet to the management workstation 30 for further analysis. Thus, every hop along the network for a given fingerprinted packet will cause that switch to send a copy of the packet with additional information to the management workstation 30. For example, if a fingerprinted packet is routed through three switches in the network between the source and destination end nodes 10, the management workstation 30 will receive three copies of the fingerprinted packet from the three switches 20 the packet encounters along its path.

Figure 3:
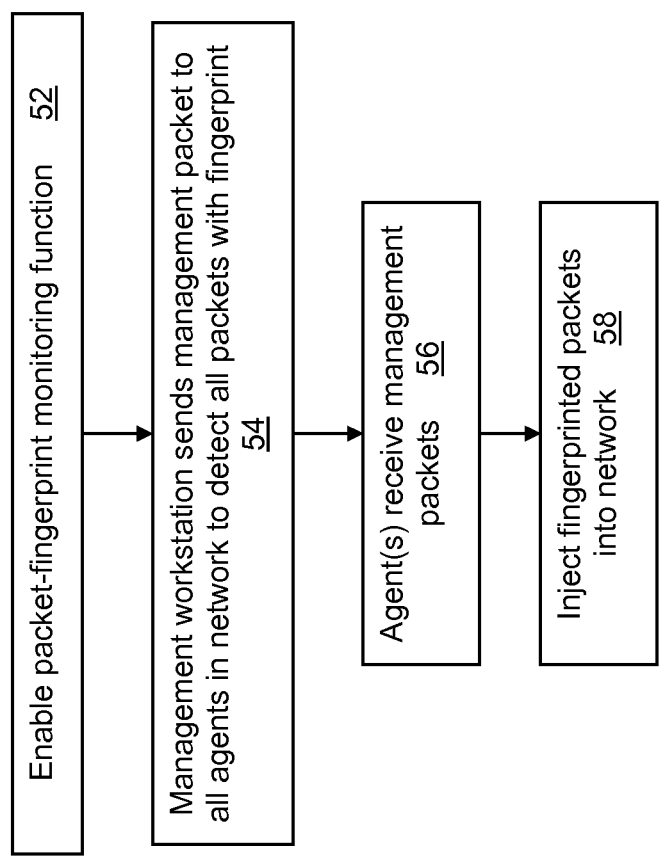
FIG. 3 shows a method in accordance with other embodiments of the invention.

FIG. 3 shows a method for configuring the agents 22 of the network in accordance with various embodiments. The various actions shown in FIG. 3 can be performed in the order shown or in a different order. Further, some of the actions can be performed in parallel. Any actions attributed to the management workstation 30 are performed, for example, by the management workstation's processor 32 executing software 40. Any actions attributed to agent 22 are performed, for example, by the corresponding switch's processor 26 executing agent software 22.

At 52, the method of FIG. 3 comprises a user interacting with the management workstation 30 to enable the packet-fingerprint monitoring function explained above. In accordance with some embodiments, the user interacts with a GUI implemented by software 40 to "click" on an option corresponding to the packet-fingerprint monitoring. At 54, the management workstation 30 sends a management packet to all agents in the network to detect all packets with such fingerprints. At 56, the agents 22 receive the management packets and configure. At 58, one or more fingerprinted packets may be injected into the network. Such packets may be placed into the network by the management workstation 30 or by way of one or more of the end nodes 10.

Figure 4:
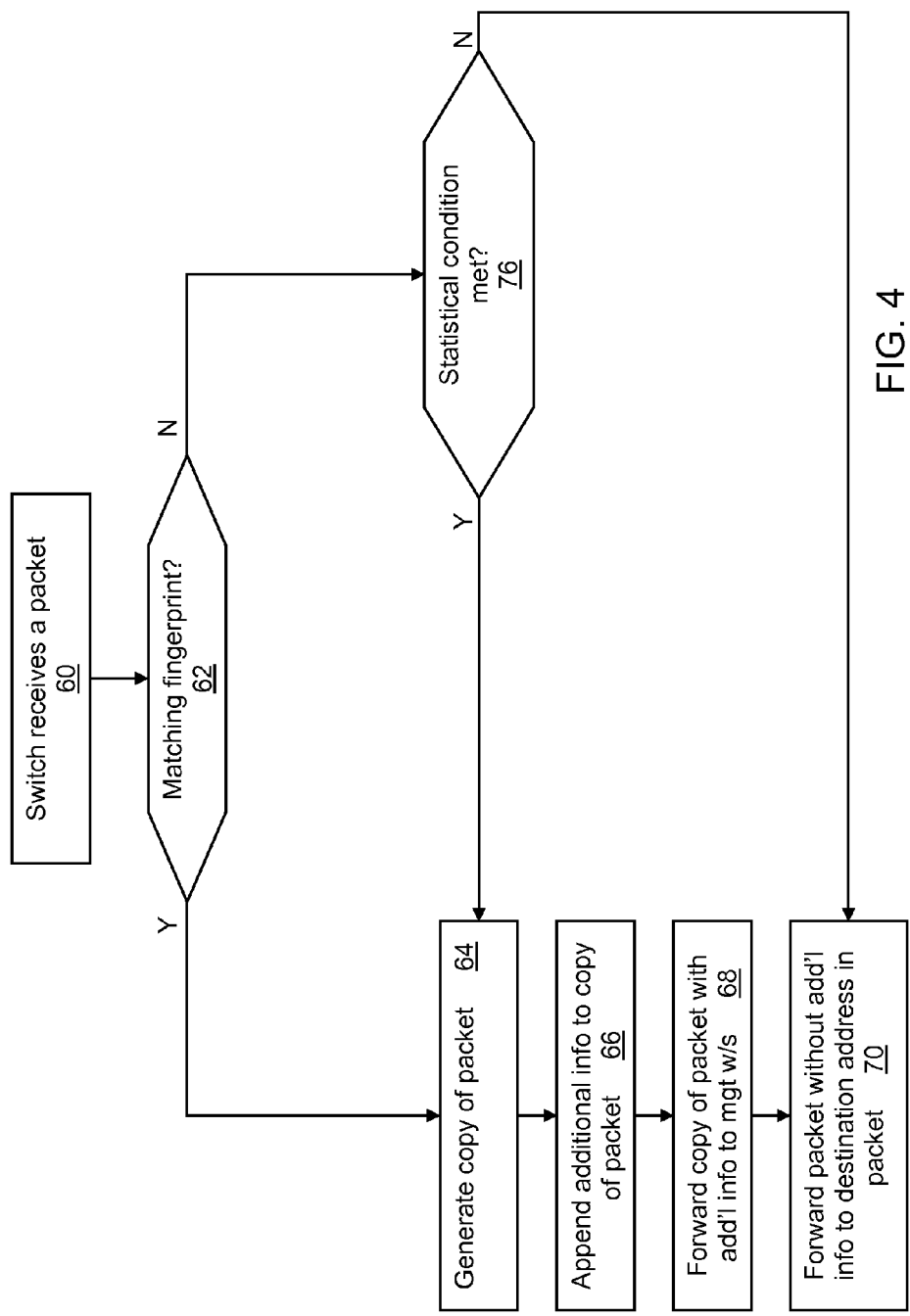
FIG. 4 shows another method in accordance with various embodiments.

FIG. 4 depicts the actions performed by each agent 22 after being configured per the method of FIG. 3 in accordance with various embodiments. The various actions shown in FIG. 4 can be performed in the order shown or in a different order. Further, some of the actions can be performed in parallel. The actions attributed to agent 22 are performed, for example, by the corresponding switch's processor 26 executing agent software 22.

At 60, the switch 20 receives a packet. At 62, the switch's agent 22 determines whether the packet received has been fingerprinted. If the packet has been fingerprinted, then the agent 22 generates a copy of the packet (64), appends the additional information to the copy of the packet (66), forwards a copy of the packet with the additional information to the management workstation at the predetermined address (68), and forwards the initially received packet without the additional information to the destination address specified in the packet (70).

If, however, the received packet does not have the fingerprint (62), then the packet nevertheless may need to be copied, appended with the additional information, and forwarded to the management workstation 30 for analysis in accordance with the periodic sampling process discussed above. Thus, decision 76 determines whether the packet should be processed anyway in accordance with actions 64-70. If not, then control passes to action 70 in which the packet is forwarded in accordance with destination address.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A switch, comprising: a switching module coupled to a plurality of ports, said switching module receives and forwards a plurality of packets through said ports; and a management unit comprising a processor and an agent executable by said processor, said agent causes the processor to monitor each packet received by the switching module and determine whether each such packet contains a predetermined fingerprint, and upon determining that a packet contains the predetermined fingerprint, said processor causes additional information to be included in a copy of said fingerprinted packet and forwarded to a predetermined address; wherein said switching module also forwards said packet containing said predetermined fingerprint, but without said additional information, to an address corresponding to a destination address of a network, the destination address contained in said packet, and wherein said predetermined fingerprint comprises a bit sequence that does not alter a path that the packet follows through the network to the destination address.

2. The switch of claim 1 wherein said management unit receives a management packet from a network, said management packet requesting said agent to begin monitoring packets for said predetermined fingerprint.

3. The switch of claim 1 wherein said management unit receives a management packet from a network, said management packet comprising said predetermined fingerprint.

4. The switch of claim 1 wherein said agent determines whether a received packet should be sampled in accordance with periodic sampling and, if a packet should be sampled, said agent causes said processor to append a copy of such packet with additional information and forward such packet to the predetermined address.

5. The switch of claim 4 wherein said agent determines whether a received packet should be sampled after determining that said packet does not contain said fingerprint.

6. The switch of claim 1 wherein said predetermined address is not an address contained in said packet.

7. A method, comprising: receiving, by a switch, a plurality of packets from a network; determining, by the switch, whether at least one packet contains a predetermined fingerprint; generating, by the switch, a copy of said at least one packet that matches said predetermined fingerprint; appending, by the switch, additional information to said copy to form a datagram; forwarding, by the switch, said datagram to a predetermined address; and forwarding, by the switch, said at least one packet that matches said predetermined fingerprint, without said additional information, to an address corresponding to a destination address of a network, the destination address contained in the packet, wherein said predetermined fingerprint comprises a bit sequence that does not alter a path that the packet follows through the network to the destination address.

8. The method of claim 7 further comprising receiving a management packet that specifies that the switch is to begin determining whether received packets contain the predetermined fingerprint.

9. The method of claim 8 further comprising receiving a management packet that specifies the predetermined fingerprint.

10. The method of claim 7 further comprising periodically selecting a received packet, generating a copy of said selected packet, appending additional information to said copy of said selected packet, and forwarding said selected packet with said additional information to said predetermined address.

11. A system, comprising: a network interface; a processor coupled to said network interface; storage containing software executable by said processor and that provides a graphical user interface to a user that permits the user to enable a function whereby a plurality of switches in a network monitor packets for a predetermined fingerprint and, upon detecting the packets forward a copy of the packets to the network interface of said system in addition to forwarding said packets to an address corresponding to a destination address of a network, the destination address contained in the packets, wherein said predetermined fingerprint comprises a bit sequence that does not alter a path that the packets follow through the network to the destination address.

12. The system of claim 11 wherein said network interface receives copies of packets from a plurality of switches in said network, each copy containing a common predetermined fingerprint.

13. The system of claim 11 wherein said software causes said processor to send a management packet to a plurality of switches in said network, said management packet comprising the predetermined fingerprint.

* * * * *